United States Patent [19]

Long et al.

[11] 3,777,600
[45] Dec. 11, 1973

[54] MACHINE FOR AND METHOD OF SEVERING MEAT SLABS

[75] Inventors: Marshall Long, Leawood, Kans.; Lewis F. Alley, Kansas City; William A. Reynolds, Galena, both of Mo.

[73] Assignee: Marlen Research Corporation, Overland Park, Kans.

[22] Filed: Oct. 13, 1971

[21] Appl. No.: 188,907

[52] U.S. Cl............. 83/39, 83/302, 82/411 R, 83/340
[51] Int. Cl............. B26d 3/00, B26d 4/22
[58] Field of Search............. 146/95, 78 R, 78 A, 146/240; 83/302, 408, 411, 340

[56] References Cited
UNITED STATES PATENTS

| | | | |
|---|---|---|---|
| 1,407,439 | 2/1922 | Pinkney | 83/411 R |
| 1,510,729 | 10/1924 | Weisner | 146/95 |
| 2,012,489 | 8/1935 | Walter | 146/78 R X |
| 2,242,557 | 5/1941 | Urschel | 146/78 A |
| 3,382,874 | 5/1968 | Pinkham | 83/411 R X |
| 3,468,356 | 9/1969 | Brauns | 146/95 |
| 3,499,475 | 3/1970 | Long | 146/95 |

FOREIGN PATENTS OR APPLICATIONS 1,276,772  10/1961  France............. 83/340

*Primary Examiner*—Willie G. Abercrombie
*Attorney*—Schmidt et al.

[57] ABSTRACT

Frozen meat slabs or the like are subjected to the constantly rotating action of a blade provided with a single convolution having a helical cutting edge for severing the slab into elongated strips whose widths are essentially the same as the distance which the slab is advanced during each revolution of the blade, and to the action of a gang of constantly rotating, peripherally sharpened discs which slice the strips into polygonal pieces, e.g., cubical, for further processing, as in stew. Each transverse kerf produced by the blade is initially concave and is progressively increased in depth and in length toward both side edges of the slab while the latter is firmly supported therebeneath by an anvil along which the blade helix causes the slab to slide continuously. The final cutting action for producing each strip is in the form of a shear during which the cutting edge of the blade acts in point contact with a concave, terminal shear edge of the anvil, causing the severed strip to fall away from the slab. The descending strips are intercepted and successively forced forwardly into the bank of discs, without interruption, along an arcuate course, in the same general direction as the path of travel of the slab, by a lobed feeder interleaved with the discs and rotating continuously about an axis parallel with the axis of rotation of the discs but in a direction opposite to the direction of disc rotation.

18 Claims, 8 Drawing Figures

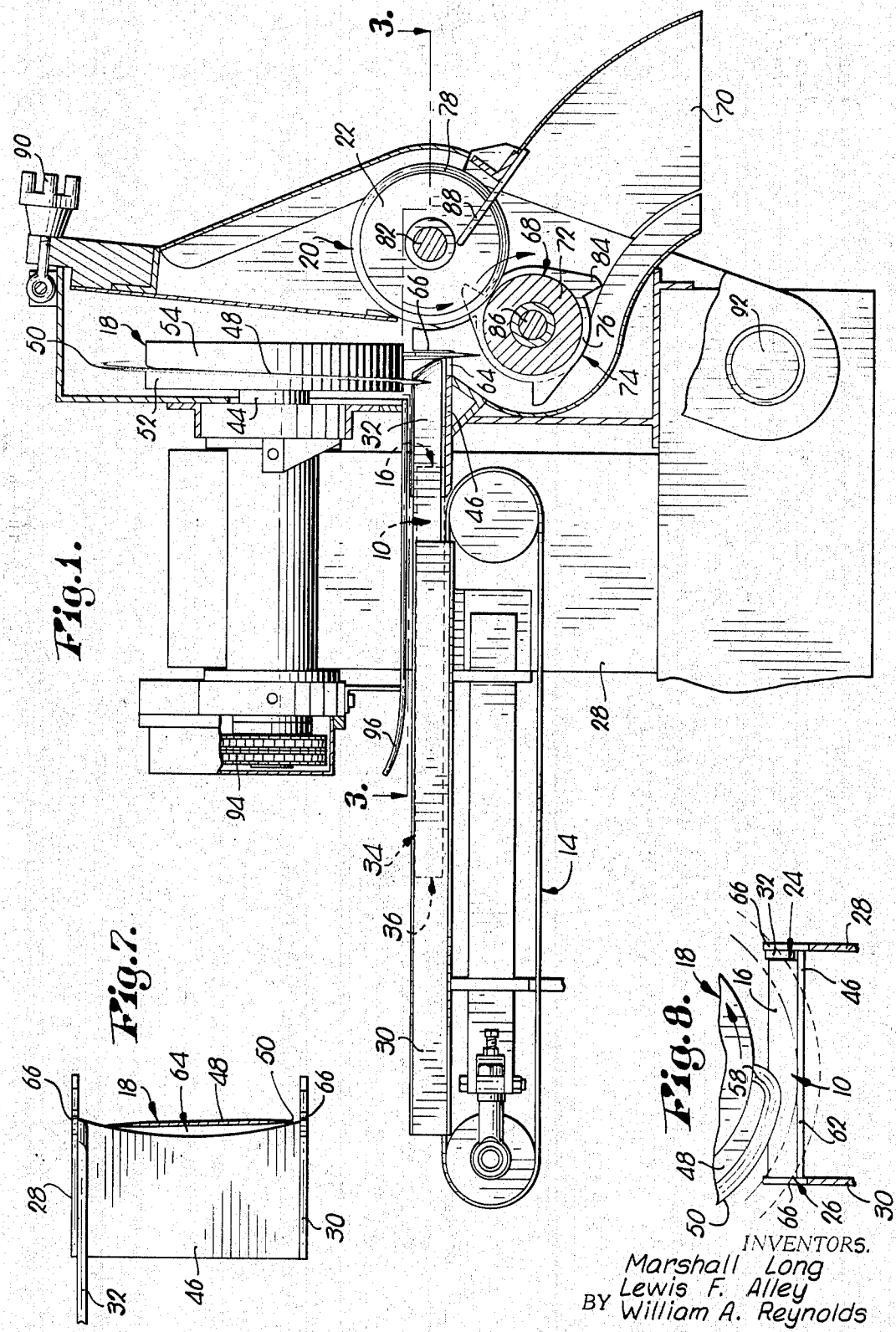

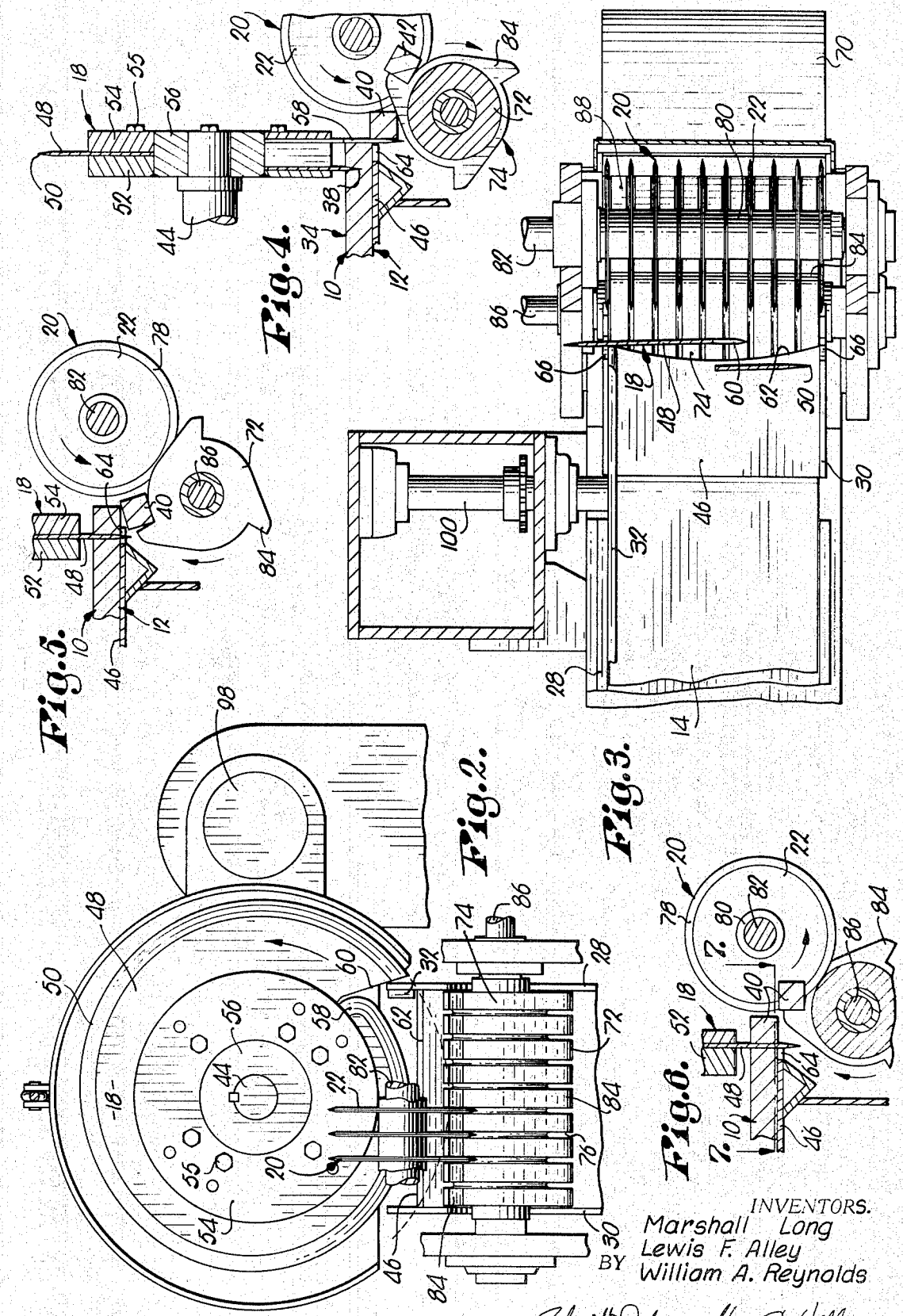

MACHINE FOR AND METHOD OF SEVERING MEAT SLABS

An important object of the present invention is to provide a machine and method for effectively subdividing frozen meat slabs into individual pieces suitable for further processing, such as use in the making of stew.

Another important object of the present invention is to permit the formation of the separate chunks of meat from a frozen slab thereof easily and quickly by subjecting the slab to but a single pass through the machine.

Still another important object of the present invention is to solve the problems peculiar to severance of frozen meat slabs by first reducing the slabs into elongated strips by a progressive cut which is gradually lengthened and deepened into the slab such that, notwithstanding the fact that frozen slabs of meat are inherently difficult to sever, the operation can be carried out rapidly, becomes simple and easy, and can be continued over long periods of time without need for interruption incident to machine repair or other time-consuming and costly maintenance procedures.

A further object of the present invention is to reduce vibration, chatter and other similar effects normally experienced in the severance of frozen meat which result in non-uniform chunks, damage to produce, broken fragments, rapid dulling of cutting edges, binding and gumming of the cutting tools and requirements of forces which not only increase the costs of the equipment itself but the expense of production of the individual chunks.

A still further object of the present invention is to further subdivide the strips into individual pieces in a continuous operation and, as in the case of severance into strips, in a manner to effect a gradual transverse slicing of the strips with pressure against a rigid backup arrangement.

In the drawings:

FIG. 1 is a side elevational view, with parts broken away and in section for clearness, of a machine for severing meat slabs, made in accordance with the present invention, and capable of use in carrying out the novel meat slab severing method hereof;

FIG. 2 is a fragmentary rear end elevational view with parts removed to show the two cutter units and the lobed feeder wheel or rotor;

FIG. 3 is a fragmentary, horizontal cross-sectional view taken on line 3—3 of FIG. 1;

FIG. 4 is a fragmentary vertical, longitudinal cross-sectional view through the cutter units, the rotor, the anvil, the slab, one of the strips and one of the pieces or chunks showing the helical blade in the same position as in FIGS. 1 and 3;

FIG. 5 is a view similar to FIG. 4 prior to slicing of the strip with the helical blade rotated 180° relative to FIGS. 1 and 3;

FIG. 6 is a view similar to FIGS. 4 and 5 showing the commencement of a strip slicing with the helical blade rotated 270° relative to FIGS. 1 and 3;

FIG. 7 is a fragmentary cross-sectional view taken on line 7—7 of FIG. 6; and

FIG. 8 is a fragmentary view, partially in vertical section looking oppositely to FIG. 2, and partially schematic showing the progressive cut of the helical blade into the meat slab.

The frozen slab of meat or the like severed and sliced in accordance with the present invention, designated 10 in the drawings, is initially placed with its lower face 12 resting upon the top stretch of a belt conveyor 14 which advances leading end 16 of slab 10 continuously at a uniform rate toward a cutter 18 and toward a bank or gang 20 of spaced cutting devices 22. The longitudinal side edges 24 and 26 of slab 10 (FIG. 8) are guided horizontally between a pair of spaced, upright walls 28 and 30 with side edge 24 held away from wall 28 by a bar 32 on the latter and spaced above belt 14. The thickness of slab 10 is understood to be the distance between lower face 12 and top face 34 therof; the longitudinal axis of slab 10 extends between leading end 16 and trailing end 36 thereof; the transverse axis of slab 10 extends between side edges 24 and 26; and both axes are normal to the thickness dimension thereof.

Cutter 18, which is rotated anticlockwise, viewing FIGS. 2 and 8, imparts a continuous cutting action to the slab 10 while it is being advanced by cutter 18 to initially form an elongated, linear, concave kerf 38 (FIGS. 2, 4 and 8) into top face 34, kerf 38 being essentially parallel with the transverse axis of slab 10. The length and depth of the kerf 38 is progressively increased by cutter 18 (FIG. 8) until an elongated strip 40 (FIGS. 4-6) is completely severed by cutter 18 from slab 10.

The width of the strip 40 will be the same as the distance slab 10 is advanced by cutter 18 while the cutting action is completed, and such width may well be substantially the same as the thickness of slab 10, depending on the design of the cutter 18 in relation to such thickness, but such similar dimensions are neither essential nor critical. The devices 22 operate to slice the strips 40 transversely of the latter into a plurality of polygonal pieces 42 (FIGS. 3 and 4) which may be substantially cubical, if desired, by proper spacing of the cutting devices 22 in relation to the factors just above mentioned.

Cutter 18 is secured to a shaft 44, which is spaced above a flat, horizontal anvil 46, and rotated about a horizontal axis which is generally parallel with the path of advancement of the slab 10 by the cutter 18 along anvil 46. The anvil 46 has its upper surface flush with the top stretch of belt 14 at the discharge end of the latter such that the slab 10 is advanced onto and along the anvil 46 by belt 14 until the cutter 18 commences to continue the slicing of the slab 10 along anvil 46. Cutter 18 includes a helical blade 48 coiled about the shaft 44 and having a helical, double bevel cutting edge 50 spaced outwardly from shaft 44 and extending along the length of blade 48, with the distance between cutting edge 50 and the axis of rotation of shaft 44 progressively increasing in the direction of advancement of slab 10, i.e., as the bank 20 of cutting devices 22 is approached.

It is to be understood that the blade 48 is defined as "helical" because of the fact that it is curved in three directions as found in a tapered screw thread, which is to be distinguished from a spiral curve situated in a single plane and having consecutive layers or convolutions, as exemplified by a watch spring. Inasmuch as blade 48 has but a single convolution, its pitch and lead are the same, defining, therefore, the distance the slab 10 moves during each full revolution of the cutter 18. Thus, cutter 18 severs the slab 10 into a number of essentially identical strips 40 each substantially equal in width to the pitch and lead of the cutting edge 50 of blade 48.

Cutter 18 has a pair of mating parts 52 and 54 joined by removable fasteners 55 and fitted around a central hub part 56 keyed to shaft 44 and welded to part 52, such parts 52, 54 and 56 cooperating to maintain the proper configuration and rigidity of blade 48 and to hold it in place.

At all times, from the commencement of the formation of the kerf 38 by the convex leading end 58 of the blade 48 intermediate the side edges 24 and 26, as shown in FIG. 8, until the straight trailing end 60 of the blade 48 has passed upwardly and outwardly beyond the face 34 of slab 10, and beyond the wall 28 and the bar 32, pressure is exerted downwardly on the top face 34 of the slab 10 by the cutting action of cutting edge 50. Thus, the lower face 12 of slab 10 must be firmly backed up by the rigid anvil or backup table 46, located below leading end 58 of blade 48, to preclude slab 10 from yielding downwardly to such pressure.

The length of kerf 38 increases gradually in both directions toward the side edges 24 and 26. Then when cutting edge 50 reaches the lower face 12, a shearing action is imparted to the slab 10 until the final stage of complete severance of strip 40 therefrom. This is accomplished by providing anvil 46 with an arcuate, terminal shearing edge 62 at the upper extremities of a cut-out 64 in that end of anvil 46 opposite to belt 14. Thus, a portion of the cutting edge 50 remote from the leading end 58 of blade 48 commences to cooperate with shearing edge 62 intermediate the ends of the latter as soon as lower face 12 is pierced and, here again, such shearing action progresses outwardly in both directions along the shearing edge 62 toward the side edges 24 and 26 of slab 10 until strip 40 is fully severed from slab 10, all as is best depicted in FIGS. 7 and 8. As noted especially in FIG. 3, the shearing edge 62 is concave in a direction facing the bank 20 of cutting devices 22 and opposite to the direction of advancement of slab 10 for a cooperative action by cutting edge 50 with shearing edge 62 as seen in FIG. 7.

Slots 66 in walls 28 and 30 clear the blade 48 and, as seen in FIS. 7 and 8, the slab 10 is fully severed adjacent wall 30 prior to complete severance at wall 28. The strips 40 drop by gravity from slab 10, as shown in FIG. 6, which means that the end of strip 40 adjacent wall 30 tends to fall first. The provision of bar 32 at the opposite end of strips 40 prevents such opposite ends from "hanging up" on wall 28 and failing to freely and quickly drop after the lower corner of slab 10 (below bar 32 at the merger of side edge 24 and lower face 12) is finally cut by blade 48.

Successive strips 40 gravitating from slab 10 are caught by structure 68 for forcing the strips 40 into the bank 20 of cutting devices 22. Structure 68 interrupts the downward progress of strips 40 (FIG. 4), raising and advancing them into the cutting devices 22 (FIG. 6); finally the pieces 42 pass through the bank 20 (FIG. 4) and descend along a chute 70.

Structure 68 is in the nature of a lobed feeder rotor 72 below trailing end 60 of blade 48, shearing edge 62 and cutting devices 22, and having an outer surface 74 upon which the strips 40 fall (FIG. 4) and which is provided with circumferential, machined grooves 76 clearing double bevel cutting edges 78 at the peripheries of disc-like devices 22. Spacers 80 on shaft 82, to which the devices 22 are secured, maintain the latter spaced apart, and such spacing, if desired, may be the same as the pitch and lead of blade 48.

Rotor 72 has a number of spaced, circumferential rows of three lobes 84 each on opposite sides of the discs 22, lobes 84 operating to carry the strips 40 along an arcuate course extending upwardly and forwardly in the same general direction as the path of travel of slab 10. The action of the lobe feeder 72 is to feed the meat strips 40 into the gang knives 22; once the strips 40 have been severed, it is the centrifugal action of the gang knives 22 imparted to the meat cubes 42 which insures that the cubes 42 will be discharged to the chute 70.

If the machine were dependent upon the lobe feeder 72 alone to push the meat cubes 42 out of the gang knives 22, then it might be possible for the cubes 42 to hang up on the surfaces 74 and be carried on around again. Hence, the high speed gang knives 22 perform their cutting action and also pick the cubes 42 off the surface and discharge them from the machine. Lobes 84 are interleaved with and pass between the discs 22 to force the pieces 42 into the bank 20 of knives 22. Thus, because of the double bevel nature of the peripheral cutting edges 78, the tendency of the pieces 42 to wedge between the discs 22 causes the discs 22 to pull the pieces 42 away from the radial edges of the slower rotating lobes 84 and direct them into chute 70. If the strips 40 fall onto the sloping faces of the lobes 84 as shown in FIG. 4, they will move gradually inwardly to the cylindrical portions of surface 74, as shown in FIG. 5, until they are engaged by the flat, radial edges of the lobes 84 as shown in FIG. 6. Inasmuch as a series of such radial edges engage the strip 40 at spaced intervals along the length of the strip 40, it will be uniformly pushed into the bank 20 of discs 22 until severed into pieces 42.

Rotor 72 is secured to a shaft 86 and the parallel, horizontal shafts 82 and 86 are driven in opposite directions. Thus, discs 22, rotating inwardly toward the lobes 84 and downwardly toward the surface 74 at the discharge of strips 40 from anvil 46, operate to slice the strips 40 against the rigidity of lobes 84 and the surface 74 as the lobes 84 force the strips upwardly and forwardly in the opposite direction. The two outer, rotating discs 22 (which need not necessarily be sharpened) operate to hold the ends of strips 40 and the two outer pieces 42 in place until discharge into chute 70. Discs 22 need rotate only about 97° before strip 40 is completely subdivided into pieces 42 by the slicing action of discs 22. Fingers or strippers 88 between discs 22 give positive assurance of discharge of all the pieces 42 into chute 70.

Upon loosening of lock fasteners 90, the bank 20, rotor 72 and chute 70 may be swung as a unit clockwise, viewing FIG. 1, about pivot 92 for cleaning and other access purposes. For the same purposes, cutter 18, its drive 94 and hold-down strips or fingers 96 for slab 10 may be swung clockwise, viewing FIG. 2, about pivot 98 toward drive shaft 100 for belt 14.

From the foregoing it can now be appreciated that slab 10 is quickly and easily reduced to chunks of meat 42 in a continuous, uninterrupted operation involving but a single pass through the machine with the cutting steps being in two stages, i.e., first subdividing the slab 10 into successive strips 40 and then subdividing each strip 40 into chunks 42 immediately after it falls away from the slab 10.

Significant also is the fact that belt 14 and fingers 96 function only to place the slab 10 into position to be received and acted upon by the cutter 18. Thereafter, the continuous, positive and uniform advancement of slab 10 along the anvil 46 is effected solely by the cutter 18 because of its special and important design as illustrated and above described.

The complete severance of each strip 40 from the slab 10 and the advancement of the latter by cutter 18 only the required distance during a single revolution of the cutter 18; the downward pressure onto the slab 10 by the cutting edge 50 against the rigid anvil 46; the initial formation of kerf 38 followed by gradual lengthening of kerf 38 in opposite directions as well as gradual deepening of kerf 38; and the shearing action of edge 50 along edge 62 are important attributes of the cutter 18 and of the strip producing step of the method which contribute significantly to solution hereof to the many problems associated with prior attempts to attain the desired end results in handling frozen meat slabs and the like.

Not to be overlooked also is the fact that the cutter 18 properly delivers the strips 40 to the slicer unit 20 such that strips 40 are in position to be received correctly by the rotor 72 and immediately fed thereby to the unit 20. Rotor 72 firmly supports the strip 40 throughout its length and all portions of the strip 40 are moved in unison toward the unit 20 so that all of the edges 78 commence their slicing action at the same time. Strip 40 is pushed against the edges 78 and into the gang 20 at a multiplicity of points along the length of strip 40 by the radial edges of the lobes 84. Thus the chunks 42 of each strip 40 are formed simultaneously after movement of the strip 40 but a short distance by the lobes 84.

The slicing action of the edges 78 is against a firm backup support for the strip 40 presented by the surface 74 of rotor 72 and by the radial edges of lobes 84. This is enhanced by the fact that throughout the slicing period the strip 40 is actually being forcibly moved by the rotor 72 toward and into the unit 20 such that neither the strip 40 nor its chunks 42 are permitted to yield away from the pressure exerted thereon by the discs 22. Moreover, the directions of rotation of shafts 82 and 86 cause the discs 22 and the feeder 72 to cooperate in assuring continued advancement of the strips 40 and the chunks 42 in the same general direction as the direction of advancement of slab 10. These factors work together in producing the rapid, smooth and trouble-free functioning of the machine under the most adverse of operating conditions and regardless of the condition and nature of the slab 10 when initially placed onto the belt 14.

Having thus described the invention what is claimed as new and desired to be secured by Letters Patent is:

1. The method of severing a meat slab or the like having a pair of opposed edges, a pair of intersecting axes and a pair of opposed faces defining the thickness thereof which is normal to said axes, said method comprising the steps of:
   continuously advancing said slab horizontally at a uniform rate along a path of travel aligned with one of said axes and with said edges;
   continuously imparting a cutting action on said slab simultaneously with the advancement thereof to initially form an elongated, linear kerf into one of said faces parallel with the other of said axes;
   progressively increasing the depth and length of said kerf by said cutting action without interrupting the latter or said advancement until an elongated strip is completely severed from the slab which is equal in width to the distance said slab is advanced during the cutting action;
   causing said strip to descend after severance thereof from the slab;
   interrupting the downward progress of said strip;
   raising the strip; and
   slicing the strip transversely thereof into a plurality of pieces as it is being raised.

2. The method of severing a meat slab or the like as claimed in Claim 1 wherein said initial kerf is formed intermediate said edges and wherein said length of the kerf is thereupon progressively increased in opposite directions toward both of said edges.

3. The method of severing a meat slab or the like as claimed in Claim 1 wherein pressure is exerted on said one face of the slab by said cutting action; and firmly backing up the opposite face of said slab at all times during the cutting action whereby to preclude the slab from yielding to the pressure exerted thereon by the cutting action into said one face of the slab.

4. The method of severing a meat slab or the like as claimed in claim 1 wherein a downward pressure is exerted on said one face of the slab by said cutting action; sliding the opposite face of said slab along a firm, horizontal surface during advancement of the slab and during said cutting action to preclude the slab from yielding to the pressure exerted thereon by the cutting action into said one face of the slab; and imparting a shear to said slab during the final stage of complete severance of the strip therefrom.

5. The method of severing a meat slab or the like having a pair of opposed edges, a pair of intersecting axes and a pair of opposed faces defining the thickness thereof which is normal to said axes, said method comprising the steps of:
   continuously advancing said slab horizontally at a uniform rate along a path of travel aligned with one of said axes and with said edges;
   continuously imparting a cutting action on said slab simultaneously with the advancement thereof to initially form an elongated, linear kerf into one of said faces parallel with the other of said axes;
   progressively increasing the depth and length of said kerf by said cutting action without interrupting the latter or said advancement until an elongated strip is completely severed from the slab which is equal in width to the distance said slab is advanced during the cutting action;
   causing said strip to descend after severance thereof from the slab;
   interrupting the downward progress of said strip;
   moving the strip transversely thereof along an arcuate course extending upwardly and forwardly in the same general direction as said path of travel of the slab; and
   slicing the strip transversely thereof into a plurality of pieces as it is being moved along said course.

6. The method of severing a meat slab or the like as claimed in claim 5 wherein a downward pressure is exerted on said one face of the slab by said cutting action; and sliding the opposite face of said slab along a firm, horizontal surface during advancement of the slab and during said cutting action to preclude the slab from yielding to the pressure exerted thereon by the cutting action into said one face of the slab.

7. The method of severing a meat slab or the like as claimed in claim 1 wherein said advancement is at a rate such that said width of the strip is substantially the same as said thickness of the slab.

8. The method of severing a meat slab or the like having a pair of opposed edges, a pair of intersecting axes and a pair of opposed faces defining the thickness thereof which is normal to said axes, said method comprising the steps of:
 continuously advancing said slab at a uniform rate along a path of travel aligned with one of said axes and with said edges;
 imparting a cutting action on said slab simultaneously with the advancement thereof to sever a number of elongated strips from the slab one at a time having their longitudinal axes parallel with the other of said axes;
 receiving the strips one at a time by a feeder as the strips are successively severed from the slab;
 feeding each received strip along a course toward a slicer before the next successive strip is received from the slab; and
 slicing the strips one at a time into a plurality of pieces as they are fed successively along said course.

9. The method of severing a meat slab or the like as claimed in claim 6; and imparting a shear to said slab during the final stage of complete severance of the strip therefrom.

10. The method of severing a meat slab or the like as claimed in claim 5, wherein said initial kerf is formed intermediate said edges and wherein said length of the kerf is thereupon progressively increased in opposite directions toward both of said edges.

11. The method of severing a meat slab or the like as claimed in claim 8, wherein is included the step of idling a received strip in the feeder while the preceding strip is sliced.

12. The method of severing a meat slab or the like as claimed in claim 8, wherein said feeding step includes moving a strip transversely thereof toward the slicer.

13. The method of severing a meat slab or the like as claimed in Claim 12, wherein said feeding step further includes pushing of a strip and the pushing force is applied at spaced locations along the length of the strip.

14. The method of severing a meat slab or the like as claimed in claim 12, wherein said feeding step further includes pushing of a strip and each strip is idled in the feeder before said pushing is initiated.

15. The method of severing a meat slab or the like as claimed in claim 12, wherein said slicing step includes severing all pieces from a strip simultaneously.

16. The method of severing a meat slab or the like as claimed in claim 8, wherein each strip descends to the feeder from the slab, said feeding step including moving the strip arcuately and transversely along said course.

17. A method of severing a meat slab having a pair of opposed faces, said method comprising the steps of:
 continuously advancing the slab at a uniform rate along a path of travel;
 continuously imparting a cutting action with a helical cutter on one face of the slab transversely to its path of travel and simultaneously with its advancement for severing the slab into a number of transversely extending strips,
 said cutting action including the intial formation of a concave kerf into said one face which is progressively deepened and lengthened;
 continuously applying a stationary backup force to the opposite face of the slab simultaneosuly with said cutting force and in direct opposition to the enlarging kerf;
 progressively discontinuing said backup support along the kerf as the latter is arcuately cut through to said opposite face of the slab; and
 shearing the slab along said kerf as the latter is cut through to said opposite face and said backup support is progressively discontinued.

18. A method of severing a meat slab as claimed in claim 17, wherein said kerf is initiated intermediate lateral extremities of the slab with respect to its path of travel and is progressively enlarged in opposite directions toward said extremities, said backup support being progressively discontinued in opposite directions toward said extremities.

* * * * *